(12) United States Patent
Pfeiffer et al.

(10) Patent No.: US 8,039,539 B2
(45) Date of Patent: Oct. 18, 2011

(54) PRODUCTION OF A COMPOSITE COMPRISING INORGANIC MATERIAL AND ORGANIC POLYMER

(75) Inventors: Jürgen Pfeiffer, Mehring (DE); Andreas Bauer, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 116 days.

(21) Appl. No.: 12/665,866

(22) PCT Filed: Jun. 11, 2008

(86) PCT No.: PCT/EP2008/057255
§ 371 (c)(1),
(2), (4) Date: Dec. 29, 2009

(87) PCT Pub. No.: WO2009/003804
PCT Pub. Date: Jan. 8, 2009

(65) Prior Publication Data
US 2010/0184907 A1    Jul. 22, 2010

(30) Foreign Application Priority Data
Jul. 4, 2007   (DE) .......................... 10 2007 030 959

(51) Int. Cl.
*C08K 3/34* (2006.01)
*C04B 111/54* (2006.01)
(52) U.S. Cl. ........ 524/493; 523/203; 523/513; 428/405; 524/499

(58) Field of Classification Search ......................... None
See application file for complete search history.

(56) References Cited

U.S. PATENT DOCUMENTS

| | | | |
|---|---|---|---|
| 3,663,493 A * | 5/1972 | Miller ........................... | 523/220 |
| 4,698,010 A | 10/1987 | Toncelli et al. | |
| 5,280,051 A * | 1/1994 | Traverso et al. ............... | 523/171 |
| 5,719,220 A | 2/1998 | Kirtley et al. | |
| 2007/0003791 A1 * | 1/2007 | Rochette ....................... | 428/703 |

FOREIGN PATENT DOCUMENTS

| | | |
|---|---|---|
| CA | 2605549 A1 | 9/2006 |
| EP | 0483280 B1 | 5/1996 |
| EP | 1878712 A1 | 1/2008 |
| JP | 08073769 A | 3/1996 |
| JP | 09241424 A | 9/1997 |
| JP | 3072697 B2 | 6/2000 |
| JP | 3209084 B2 | 7/2001 |
| JP | 2004099351 A | 4/2004 |
| WO | 2006100321 A1 | 9/2006 |

OTHER PUBLICATIONS

Sato J. et al, Polyester Polymer Concrete, Chemical Abstract, American Chemical Society, US. vol. 78, No. 26, Jul. 2, 1973, p. 244.

* cited by examiner

*Primary Examiner* — Marc Zimmer
(74) *Attorney, Agent, or Firm* — Brooks Kushman P.C.

(57) ABSTRACT

Physical properties and soiling resistance of polymer-bound inorganic composites such as artificial stone are improved by incorporating a silane adhesion promoter and at least one of three organosilicon compounds.

11 Claims, No Drawings

PRODUCTION OF A COMPOSITE COMPRISING INORGANIC MATERIAL AND ORGANIC POLYMER

CROSS-REFERENCE TO RELATED APPLICATION

This application is the U.S. national phase of PCT Appln. No. PCT/EP2008/057255 filed Jun. 11, 2008 which claims priority to German application DE 10 2007 030 959.9 filed Jul. 4, 2007.

BACKGROUND OF THE INVENTION

1. Field of the Invention

The invention relates to a process for producing composites comprising inorganic material, organic polymer and silane adhesion promoter.

2. Description of the Related Art

Organosilicon compounds having unsaturated organic functional groups such as vinyl, acryloyl or methacryloyl groups, are widely used as adhesion promoters between inorganic and organic materials, for example in sizers for glass fibers, as crosslinking agents in organic polymers or for the treatment of fillers.

An important use of such silanes is moreover the improvement, achievable by the adhesion-promoting effect, of the mechanical properties of artificial stones which can be produced from inorganic fillers and curable, organic resins.

The silanes carrying unsaturated groups can be added both according to EP 483280 B1 for the pretreatment of corresponding fillers and for the "in situ" treatment directly in the formulation of the end product, as described in JP 3209084 B.

In the production of artificial stone products based on organic resins and inorganic fillers, a distinction is made essentially between two products, namely so-called solid surface products, which generally consist of ATH (aluminum trihydrate)-filled polymethyl methacrylate (PMMA), and the so-called quartz surface products, which are generally based on $SiO_2$-filled unsaturated polyester resins (UP resins). Of particular importance are processes in which the silane is used in situ and in which the mixture consisting of the inorganic, generally silicate fillers, the UP resin and optionally additional additives is compacted prior to curing in vacuo and with vibration, as is carried out in the so-called Breton process described in U.S. Pat. No. 4,698,010.

A disadvantage of the silane adhesion promoters typically used to date is the relatively high price which, in spite of the small amount used (in general about 0.05-1.0% by weight, based on the total raw material mixture), accounts for a not inconsiderable part of the total raw material costs. Moreover, a reduction in the tendency to soiling and an improvement in the hot water resistance and weathering resistance of the artificial stone products produced according to the present state of the art would be desirable.

JP 2004099351 describes the use of a silane adhesion promoter together with a further alkoxy silane or the (co)hydrolyzates thereof for the surface pretreatment of fillers for use in artificial marble.

JP 3072697 B describes the use of methyl or ethyl silicate and polymers thereof in the mixture with a silane adhesion promoter having unsaturated groups. Once again, the use of such a mixture for the pretreatment of inorganic fillers, in this case ATH, is described.

JP 3209084 B describes the use of mixtures consisting of a thermally curable organic resin and inorganic powders or fibers, which are treated with a mixture of alkoxysilanes having unsaturated groups and siloxanes, in order to increase the water resistance. The addition of these components can be effected both to the filler and to the mixture of the filler with the resin.

SUMMARY OF THE INVENTION

The invention relates to a process for producing a composite, namely an artificial stone product in which inorganic material which is selected from inorganic powders and particles is mixed with organic polymer and simultaneously or subsequently mixed with (A) silane adhesion promoter of the general formula (1)

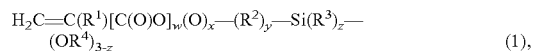

in which $R^1$ is a hydrogen atom or a linear or branched hydrocarbon radical having 1-10 carbon atoms, $R^2$ is a divalent linear, cyclic or branched hydrocarbon radical having 1-40 carbon atoms which may contain one or more heteroatoms selected from the elements nitrogen, oxygen, sulfur or phosphorus, $R^3$ and $R^4$ are linear, cyclic or branched hydrocarbon radicals having 1-10 carbon atoms, w has the values 0 or 1, x has the values 0 or 1, y has the values 0 or 1 and z has the values 0, 1 or 2, with the proviso that w and x must not both simultaneously be 1, and organosilicon compounds which are selected from (B) siloxane which is composed of from 0.0 to 80.0 mol % of units of the general formula (2)

from 0 to 5.0 mol % of units of the general formula (3)

from 0 to 99.5 mol % of units of the general formula (4)

from 0 to 90.0 mol % of units of the general formula (5)

in which $R^5$ is a hydrogen atom, hydroxyl group, SiC-bonded, optionally substituted $C_1$- to $C_{18}$-hydrocarbon radical, which may be interrupted by divalent radicals —O—, —COO—, —OOC—, —CONR$^6$—, —NR$^6$CO— and —CO— bonded on both sides to carbon atoms, or $C_1$- to $C_{18}$-hydrocarbon-oxy radical, $R^6$ is a hydrogen atom or a $C_1$- to $C_{18}$-hydrocarbon radical, with the proviso that the organopolysiloxanes (B) have at least 2 units of the general formulae (2) to (5) and the sum of the units of the general formulae (2) to (5) is 100 mol %, (C) organosilicon compound which is composed of from 0.0 to 100.0 mol % of units of the general formula (6)

from 0.0 to 98.0 mol % of units of the general formula (7)

from 0.0 to 98.0 mol % of units of the general formula (8)

from 0.0 to 98.0 mol % of units of the general formula (9)

$$[SiO_{4/2}] \tag{9}$$

in which $R^7$ is a hydroxyl group, divalent SiC-bonded, optionally substituted $C_1$- to $C_{18}$-hydrocarbon radical, which may be interrupted by divalent radicals from the group consisting of —O—, —COO—, —OOC—, —CONR$^6$—, —NR$^6$CO— and —CO— bonded on both sides to carbon atoms, or a $C_1$- to $C_{18}$-hydrocarbon-oxy radical, with the proviso that, in the organosilicon compounds (C), at least 90 mol % of the radicals $R^7$ are $C_1$- to $C_{18}$-hydrocarbon-oxy radicals and the sum of the units of the general formulae (1) to (4) is 100 mol %, and (D) organosilane of the general formula (10)

$$Si(R^8)_4 \tag{10}$$

in which $R^8$ are $C_1$- to $C_{18}$-hydrocarbon-oxy radicals.

In the preparation of the composites, the use of the combination of silane adhesion promoters (A) carrying unsaturated groups and of organosilicon compounds (B), (C), (D) has substantial advantages.

The required amount of silane adhesion promoters (A) carrying unsaturated groups for improving the mechanical properties of the artificial stone products is reduced, which has a substantial cost benefit.

The retention of the effect of the pure silane adhesion promoter (A) in improving the mechanical strength on replacement by the combination of silane adhesion promoters (A) carrying unsaturated groups and of organosilicon compounds (B), (C), (D) was not to be expected.

Thus, the use of the combinations of the components (A), (B), (C) and (D) also contributes to the reduction of the raw material costs with a skillful choice by the person skilled in the art.

Moreover, the amount of liberated vaporizable organic compounds can be substantially reduced, which represents considerable progress in the context of reduced liberation of environmentally harmful substances. Furthermore, the tendency of the composites to soiling is reduced in comparison with various media typically occurring in the area of artificial stone products.

Examples of unsubstituted radicals $R^1$, $R^3$, $R^4$, $R^5$, $R^6$ and $R^7$ are alkyl radicals such as the methyl and ethyl radicals; cycloalkyl radicals such as the cyclohexyl radical; aryl radicals such as the phenyl, biphenylyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the alpha and the β-phenylethyl radical.

The hydrocarbon radicals of the radicals $R^1$, $R^3$, $R^4$, $R^5$, $R^6$ and $R^7$ are preferably unsubstituted and substituted $C_1$- to $C_6$-alkyl radicals, the phenyl radical, and in particular the methyl, ethyl, propyl and phenyl radical.

The hydrocarbon-oxy radicals $R^7$ and $R^6$ are preferably $C_1$- to $C_6$-alkoxy radicals, in particular methoxy and ethoxy radicals.

Examples of substituted hydrocarbon radicals as radical $R^5$ are hydrocarbon radicals halogenated with fluorine, chlorine or bromine, mercaptoalkyl radicals; ureidoalkyl radicals; epoxyalkyl radicals; (meth) acryloyloxyalkyl radicals, cyanoalkyl radicals; aminoalkyl radicals; aminoaryl radicals; quaternary ammonium radicals; hydroxyalkyl radicals; phosphonic acid radicals; phosphonate radicals and sulfonate radicals.

Examples of silane adhesion promoters of the general formula (1) are acryloylsilanes such as acryloyloxymethrimethoxysilane, acryloyoxymethltriethoxysilane, acryloyoxymethyltriisopropoxysilane, acryloyoxymethyl(methyl) dimethoxysilane, acryloyloxmethyl(methyl)diethoxysilane, acryloyloxymethyl(dimethyl)methoxysilane, acryloyloxymethyl(dimethyl)ethoxysilane, 3-acryloyloxypropyltrimethoxysilane, 3-acryloyloxypropyltriethoxysilane, 3-acryloyloxypropyl(methyl)dimethoxysilane, 3-acryloyloxypropyl(methyl)diethoxysilane, 3-acryloyloxypropyl(dimethyl)methoxysilane, 3-acryloyloxypropyl(dimethyl)ethoxysilane; or methacryloylsilanes such as methacryloyloxymethyltrimethoxysilane, methacryloyloxymethyltriethoxysilane, methacryloyloxymethyltriisopropoxysilane, methacryloyloxymethyl(methyl)methoxysilane, methyacryloyloxymethyl(methyl)diethoxysilane, methacryloyloxymethyl(dimethyl)methoxysilane, methacryloyloxymethyl(dimethyl)ethoxysilane, 3 methacryloyloxypropyltrimethoxysilane, 3-methacryloyloxypropyltriethoxysilane, 3 methacryloyloxypropyltriisopropoxysilane, 3-methacryloyloxypropyl(methyl) dimethoxysilane, 3-methacryloyloxypropyl(methyl)diethoxysilane, 3-methacryloyloxypropyl(methyl)diisopropoxysilane, 3-methacryloyloxypropyl(di-methyl) methoxysilane, 3-methacryloyloxypropyl(dimethyl) ethoxysilane, 3-methacryloyloxypropyl(dimethyl) isopropoxysilane, or vinylsilanes such as vinyltrimethoxysilane, vinyl(methyl)dimethoxysilane, vinyl (dimethyl)methoxysilane, vinyltriethoxysilane, vinyl(methyl)diethoxysilane, vinyl(dimethyl)ethoxysilane, vinyltris(2-methoxyethoxy)silane, vinyl(methyl)bis(2-methoxyethoxy) silane, vinyl(methyl)diisopropoxysilane, and vinyl (dimethyl)isopropoxysilane.

Preferred silanes (A) of the general formula (1) are acryloyloxymethyltrimethoxysilane, acryloyloxymethyltriethoxysilane, 3-acryloyloxypropyltrimethoxysilane, methacryloyloxymethyltrimethoxysilane, methacryloyloxymethyltriethoxysilane, methacryloyloxymethyl(methyl)dimethoxysilane, methacryloyloxymethyl(methyl)diethoxysilane, 3-methacryloyloxypropyltrimethoxysilane, 3-methacryloyloxypropyltriethoxysilane, 3-methacryloyloxypropyltriisopropoxysilane, vinyltrimethoxysilane, vinyl(methyl)dimethoxysilane, vinyltriethoxysilane, vinyltris(2-methoxyethoxy)silane, and vinyltriisopropoxysilane, most preferably acryloyloxymethyltrimethoxysilane, methacryloyloxy-methyltrimethoxysilane, 3-methacryloyloxypropyltrimethoxysilane, vinyltrimethoxysilane and vinyltriethoxysilane.

In addition to the component (A), one or more components of (B), (C) and (D) can be used.

Preferably, the organopolysiloxanes (B) contain
from 10 to 60.0 mol % of units of the general formula (2),
from 0 to 1.0 mol % of units of the general formula (3),
from 0 to 10.0 mol % of units of the general formula (4) and
from 0 to 80.0 mol % of units of the general formula (5).

In another preferred embodiment, the organopolysiloxanes (B) contain
from 0 to 60.0 mol % of units of the general formula (2),
from 0 to 1.0 mol % of units of the general formula (3),
from 0 to 90.0 mol % of units of the general formula (4) and
from 0 to 10.0 mol % of units of the general formula (5).

Preferably, the organopolysiloxanes (B) have at least 5, in particular at least 10, preferably not more than 1000 and in particular not more than 100 units of the general formulae (2) to (5).

Preferably, the organosilicon compounds (C) contain
from 10 to 100.0 mol % of units of the general formula (6),
from 0 to 70 mol % of units of the general formula (7),
from 0 to 40.0 mol % of units of the general formula (8) and
from 0 to 40.0 mol % of units of the general formula (9).

Preferably, at least 95 mol %, in particular at least 99 mol %, of the radicals $R^7$ are $C_1$- to $C_{18}$-hydrocarbonoxy radicals.

The ratio of the components (A), (B), (C) and (D) is preferably chosen so that 20-90% by weight of the component (A), 0-80% by weight of (B), 0-80% by weight of (C) and 0-80% by weight of (D) are present, the sum of the components (B), (C) and (D) being at least 10% by weight and the sum of the components (A), (B), (C) and (D) being 100% by weight.

Preferably, the ratio of the components (A), (B), (C) and (D) is chosen so that the mixture are contains 40-70% by weight of the component (A), 0-60% by weight of (B), 0-60% by weight of (C) and 0-60% by weight of (D), the sum of the components (B), (C) and (D) being at least 30% by weight.

Most preferably, the ratio of the components (A), (B), (C) and (D) is chosen so that the mixture contains 45 60% by weight of the component (A), 0 55% by weight of (B), 0 55% by weight of (C) and 0 55% by weight of (D), the sum of the components (B), (C) and (D) being at least 40% by weight.

The four components (A), (B), (C) and (D) can be either premixed and added in this form to the remaining components of the composite or they can also be added separately in succession in any desired sequence to the further components of the composite. The four components (A), (B), (C) and (D) can be added to the mixture consisting of inorganic material, organic polymer and optionally further additives or can be mixed in an upstream mixing step with the organic polymer, which only then is mixed with the inorganic material.

Preferably, the components (A), (B), (C) and (D) are used as a mixture in an upstream mixing step with the organic polymer and optionally further components, which only thereafter is mixed with the inorganic material.

Most preferably, the components (A), (B), (C) and (D) are used as a mixture by first homogeneously mixing them with the organic polymer and optionally further components and mixing them in a subsequent step with the inorganic material.

Preferably, the process serves for producing any desired artificial stone products. Preferably, artificial stone products which contain at least 70% by weight, and in particular at least 90% by weight and not more than 98% by weight, most preferably not more than 95% by weight, of inorganic material are produced.

Amorphous or crystalline silica, sand, feldspar, granite or other silicate solids are preferably used as the inorganic material.

Preferably, the inorganic powders have, based on their particle size distribution, the following size distribution:
10-40% by weight of particles having a size of <0.1 mm,
10-40% by weight of particles having a size of 0.1-0.6 mm,
1-80% by weight of particles having a size of 0.61-1.2 mm and
10-50% by weight of particles having a size of 1.21-15 mm.

Preferably used organic polymers are unsaturated polyester resins or acrylate resins, as described, for example, in WO 2006/100321 A1, which is hereby incorporated by reference.

Preferred acrylate resins are esters of polyacrylic acid or of polymethacrylic acid. The methyl, ethyl, n-butyl, 2-ethylhexyl, isobutyl and tert-butyl esters and lauryl esters are particularly preferred. Polymethyl methacrylate and (PMMA) polymethyl acrylate are particularly preferred.

Unsaturated polyester resins (UP resins) are reactive resins based on unsaturated polyesters which cure with polymerization and crosslinking to give thermosetting materials. Condensates of saturated and unsaturated dicarboxylic acids or acid anhydrides, such as, for example, maleic acid, fumaric acid, maleic anhydride, crotonic acid, phthalic acid, isophthalic acid, terephthalic acid, adipic acid, succinic acid, tetrahydrophthalic anhydride, and di- or oligools, such as, for example, ethylene glycol, 1,2-propylene glycol, 1,3-propylene glycol, diethylene glycol, dipropylene glycol, 1,3- or 1,4-butanediol, pentylglycol, neopentylglycol, glycerol, reaction products of bisphenol A or hydrogenated bisphenol A with ethylene oxide or propylene oxide, trimethylolpropane or pentaerythritol are preferably used as unsaturated polyester resins. The unsaturated polyester resins preferably contain, as additional components, copolymerizable monomers, such as, for example, styrene, α-methylstyrene, γ-methylstyrene, vinyltoluene, methyl methacrylate, acrylic acid, ethyl methacrylates. The unsaturated polyester resins optionally also contain bifunctional monomers, such as divinylbenzene or diallyl phthalate.

Free radical initiators, such as tert-butyl peroxobenzoate or tert-butyl 2-ethylperoxohexanoate, are preferably added in the production of the composites for curing the organic polymer.

Metal salts, in particular a cobalt complex compound, such as cobalt (II) dioctanoate, are preferably added in the production of the composites as an accelerator for the free radical reaction.

In addition to the components (A), (B), (C) and (D), a monomeric alkyltrialkoxysilane may optionally be added. Typical examples of such alkyltrialkoxysilanes are methyltrimethoxysilane, methyltriethoxysilane, methyltriisopropoxysilane, ethyltrimethoxysilane, ethyltriethoxysilane, ethyltriisopropoxysilane, phenyltrimethoxysilane, phenyltriethoxysilane or phenyltriisopropoxysilane.

Further components, such as inorganic pigments or colored glass particles, may optionally be added to the composite in order to comply with the respective design specifications. Furthermore, UV absorbers and antioxidants may also be added in order to improve the weathering stability of the artificial stone products produced from the composite.

The following are preferably used in the production of composites:
1-20% by weight, in particular 3-10% by weight, of organic polymer,
0.005-1% by weight, in particular 0.01-0.5% by weight, of free radical initiator,
0.0005-0.01% by weight, in particular 0.01-0.03% by weight, of metal salt,
0.005-1% by weight, in particular 0.01-0.5% by weight, of components (A), (B), (C) and (D) together.

The composite is preferably cured at elevated temperature, preferably at from 70 to 150° C., and in particular at from 90 to 120° C.

Most preferably, the process according to the invention is carried out as a "Breton process" in which the raw materials used for producing the artificial stone products, after they have been mixed, are compacted in vacuo, under pressure and with vibration before curing is effected at elevated temperature.

Typically, the raw material composition for the production, according to the invention, of artificial stone products by the very particularly preferred "Breton process" contains:
90-95% by weight of inorganic material,
4-9% by weight of organic polymer,
0.01-0.5% by weight of free radical initiator, 0.001-0.03% by weight of metal salt,
0.01-0.5% by weight as the sum of components (A), (B), (C) and (D).

All above symbols of the above formulae have their meanings in each case independently of one another. In all formulae, the silicon atom is tetravalent.

Some examples which demonstrate the advantages of the process according to the invention for improving the mechanical properties and the soiling stability of artificial stone products are mentioned below.

In the examples and comparative examples, unless stated otherwise in each case, all stated amounts and percentages are based on weight and all reactions are carried out at a pressure of 0.10 MPa (abs.) and a temperature of 20° C.

COMPARATIVE EXAMPLE 1 (C1)

87 g of an unsaturated polyester resin (Palatal® P4 from DSM) are mixed with 1.7 g of tert-butyl peroxy-2-ethylhexanoate (TBPEH) and 0.17 g of cobalt (II) octanoate with stirring. 260 g of filler (consisting of 80% by weight of quartz powder having a particle size of <20 μm and 20% by weight of quartz powder having a particle size of 20-45 μm), 236 g of quartz sand having a particle size of 0.1-0.3 mm, 164 g of quartz sand having a particle size of 0.4-0.7 mm and 253 g of quartz sand having a particle size of 0.7-1.2 mm are added to this mixture and the mixture thus obtained is thoroughly mixed with the aid of a planetary mixer of the type LPV-1 from PC Laborsysteme for 10 minutes. This mixture is introduced into a steel mold measuring 15×15×2 cm and is compressed by means of a press under a pressure of about 6 kg/cm$^2$ for 15 minutes. The blank thus obtained is cured at 100° C. for 30 minutes. After storage for 48 hours at room temperature, test specimens are cut out for the determinations of the mechanical properties or investigations into the tendency to soiling are carried out.

COMPARATIVE EXAMPLE 2 (C2)

The procedure of comparative example 1 is repeated, with the difference that, before addition of the TBPEH, 1 g of 3-methacryloyloxypropyltrimethoxysilane (GENIOSIL® GF 31 from Wacker Chemie AG) is added to the unsaturated polyester resin Palatal® P4.

Example 1 (Ex. 1)

The procedure of comparative example 1 is repeated, with the difference that, before addition of the TBPEH, 1 g of a mixture consisting of 50% by weight of 3-methacryloyloxypropyltrimethoxysilane (GENIOSIL® GF 31 from Wacker Chemie AG) and 50% by weight of an ethoxy functional methylpolysiloxane (viscosity according to DIN 51562-1=20 mm$^2$/s, Mw about 2500 g/mol, content of alkoxy groups about 40% by weight) is added to the unsaturated polyester resin Palatal® P4.

Example 2 (Ex. 2)

The procedure of comparative example 1 is repeated, with the difference that, before addition of the TBPEH, 1 g of a mixture consisting of 50% by weight of 3-methacryloyloxypropyltrimethoxysilane (GENIOSIL® GF 31 from Wacker Chemie AG) and 25% by weight of an ethoxy functional methylpolysiloxane (viscosity according to DIN 51562-1=20 mm$^2$/s, Mw about 2500 g/mol, content of alkoxy groups about 40% by weight) and 25% by weight of tetraethoxysilane is added to the unsaturated polyester resin Palatal® P4.

Example 3 (Ex. 3)

The procedure of comparative example 1 is repeated, with the difference that, before addition of the TBPEH, 1 g of a mixture consisting of 40% by weight of vinyltrimethoxysilane (GENIOSIL® XL 10 from Wacker Chemie AG), 30% by weight of a methoxy functional methylsilicone resin (viscosity according to DIN 51562-1=27 mm$^2$/s, Mw about 2500 g/mol, content of alkoxy groups about 22% by weight) and 30% by weight of tetramethoxysilane is added to the unsaturated polyester resin Palatal® P4.

Example 4 (Ex. 4)

The procedure of comparative example 1 is repeated, with the difference that, before addition of the TBPEH, 1 g of a mixture consisting of 49% by weight of 3-methacryloyloxypropyltrimethoxysilane (GENIOSIL® GF 31 from Wacker Chemie AG), 49% by weight of tetraethoxysilane and 2% of phenyltriethoxysilane is added to the unsaturated polyester resin Palatal® P4.

Example 5 (Ex. 5)

The procedure of comparative example 1 is repeated, with the difference that, before addition of the TBPEH, 1 g of a mixture consisting of 40% by weight of 3-methacryloyloxypropyltrimethoxysilane (GENIOSIL® GF 31 from Wacker Chemie AG), 30% by weight of a methoxy functional methylsilicone resin (viscosity according to DIN 51562-1=27 mm$^2$/s, Mw about 2500 g/mol, content of alkoxy groups about 22% by weight) and 30% by weight of tetramethoxysilane is added to the unsaturated polyester resin Palatal® P4.

Example 6 (Ex. 6)

The procedure of comparative example 1 is repeated, with the difference that, before addition of the TBPEH, 1 g of a mixture consisting of 40% by weight of 3-methacryloyloxypropyltrimethoxysilane (GENIOSIL® GF 31 from Wacker Chemie AG), 30% by weight of a phenylpropylpolysiloxane composed of T-units (softening point about 45° C., OH content according to Zerewitinoff=3.9%, Mw about 1600 g/mol) and 30% by weight of tetraethoxysilane is added to the unsaturated polyester resin Palatal P4.

Example 7 (Ex. 7)

The procedure of comparative example 1 is repeated, with the difference that, before addition of the TBPEH, 1 g of a mixture consisting of 40% by weight of methacryloyloxymethyltrimethoxysilane (GENIOSIL® XL 33 from Wacker Chemie AG), 30% by weight of a methoxyfunctional methylsilicone resin (viscosity according to DIN 51562-1=27 mm$^2$/s, Mw about 2500 g/mol, content of alkoxy groups about 22% by weight) and 30% by weight of tetramethoxysilane is added to the unsaturated polyester resin Palatal® P4.

Example 8 (Ex. 8)

The procedure of comparative example 1 is repeated, with the difference that, before addition of the TBPEH, 1 g of a mixture consisting of 40% by weight of 3-methacryloyloxypropyltrimethoxysilane (GENIOSIL® GF 31 from Wacker Chemie AG), 30% by weight of an ethoxy functional methylsilicone resin (viscosity according to DIN 51562-1=20 mm$^2$/s, Mw about 2500 g/mol, content of alkoxy groups about 40% by weight) and 30% by weight of an oligomerized tetraethoxysilane (SiO$_2$ content of about 41%) is added to the unsaturated polyester resin Palatal® P4.

Example 9 (Ex. 9)

The procedure of comparative example 1 is repeated, with the difference that, before addition of the TBPEH, 1 g of a mixture consisting of 40% by weight of vinyltriethoxysilane (GENIOSIL® GF 56 from Wacker Chemie AG), 30% by weight of an ethoxy functional methylsilicone resin (viscosity according to DIN 51562-1=20 mm²/s, Mw about 2500 g/mol, content of alkoxy groups about 40% by weight) and 30% by weight of an oligomerized tetraethoxysilane (SiO₂ content of about 41%) is added to the unsaturated polyester resin Palatal® P4.

Investigations into the mechanical strength, according to DIN EN 14617-2, and into the abrasion resistance, according to UNI 10532, are carried out on the test specimens from examples 1-9. The results of these investigations are summarized in the following table 1.

In addition, slabs of the artificial stone products produced in examples 1-9 were wetted with drops of different liquid test substances. The slabs thus treated were stored at 25° C. and 50% relative humidity for 48 hours. Thereafter, the test substances were washed off with demineralized water containing washing agent, the surface was dried with a lint-free cloth and the damage to the surface was assessed visually (scale 1-5, 1=no damage, 5=surface perceptibly roughened/etched). The results of these assessments are summarized in table 2.

TABLE 1

Results of the mechanical tests for the flexural strength and abrasion resistance on test specimens of the artificial stone products produced according to the examples 1-9 and comparative examples 1-2

| | Ex. 1 | Ex. 2 | Ex. 3 | Ex. 4 | Ex. 5 | Ex. 6 | Ex. 7 | Ex. 8 | Ex. 9 | C 1 | C 2 |
|---|---|---|---|---|---|---|---|---|---|---|---|
| Flexural Strength [MPa] | 55.3 | 59.3 | 48.9 | 60.5 | 57.2 | 61.5 | 60.2 | 60.1 | 45.3 | 35.2 | 61.1 |
| Abrasion Resistance [mm³] | 167 | 163 | 180 | 165 | 165 | 163 | 160 | 165 | 160 | 195 | 165 |

It is clearly evident from the results that the mixtures according to the invention substantially improve the mechanical properties in comparison with a product without adhesion promoter, the improvements to the mixtures which contain a vinylsilane being substantially smaller.

TABLE 2

Results of the tests for the chemical stability on test specimens of the artificial stone products produced according to the examples 1-9 and comparative examples 1-2

| | Ex. 1 | Ex. 2 | Ex. 3 | Ex. 4 | Ex. 5 | Ex. 6 | Ex. 7 | Ex. 8 | Ex. 9 | C 1 | C 2 |
|---|---|---|---|---|---|---|---|---|---|---|---|
| Water | 1 | 1 | 2 | 1 | 1 | 1 | 1 | 1 | 1 | 2 | 1 |
| SF oil[1] | 2 | 2 | 3 | 2 | 2 | 3 | 3 | 2 | 3 | 4 | 4 |
| Coffee | 2 | 3 | 3 | 2 | 3 | 2 | 3 | 2 | 3 | 3 | 3 |
| Vinegar | 4 | 4 | 5 | 4 | 4 | 4 | 4 | 4 | 5 | 5 | 5 |
| Ketchup | 5 | 5 | 5 | 4 | 4 | 5 | 5 | 4 | 4 | 5 | 5 |
| Mustard | 4 | 5 | 4 | 5 | 5 | 4 | 4 | 5 | 5 | 5 | 5 |
| Red wine | 3 | 3 | 3 | 2 | 2 | 3 | 3 | 2 | 3 | 4 | 4 |
| SSO[2] | 3 | 3 | 3 | 2 | 2 | 2 | 3 | 3 | 3 | 3 | 4 |
| AMB[3] | 2 | 2 | 2 | 2 | 2 | 1 | 1 | 1 | 2 | 2 | 2 |

[1] Sunflower oil;
[2] Soya-Sudan Orange;
[3] Aqueous methylene blue solution

The invention claimed is:

1. A process for producing an artificial stone composite, comprising mixing an inorganic component comprising
10-40% by weight of particles having a size of <0.1 mm,
10-40% by weight of particles having a size of 0.1-0.6 mm,
1-80% by weight of particles having a size of 0.61-1.2 mm and
10-50% by weight of particles having a size of 1.21-15 mm,
wherein the inorganic powder comprises at least 90% of the composite, with at least one organic polymer binder and simultaneously or subsequently mixing with a mixture comprising
(A) at least one silane adhesion promoter of the formula (1)

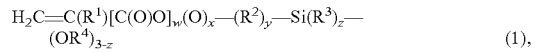

in which
$R^1$ is a hydrogen atom or a linear or branched hydrocarbon radical having 1-10 carbon atoms,
$R^2$ is a divalent linear, cyclic or branched hydrocarbon radical having 1-40 carbon atoms optionally containing one or more heteroatoms selected from the group consisting of nitrogen, oxygen, sulfur, and phosphorus,
$R^3$ and $R^4$ are linear, cyclic or branched hydrocarbon radicals having 1-10 carbon atoms,
w is 0 or 1,
x is 0 or 1,
y is 0 or 1 and
z is 0, 1 or 2,
with the proviso that w and x must not both simultaneously be 1,
and one or more organosilicon compounds (B), (C), and (D):

(B) siloxanes comprising
from 0.0 to 80.0 mol % of units of the formula (2)

from 0 to 5.0 mol % of units of the formula (3)

from 0 to 99.5 mol % of units of the formula (4)

$$[R^5SiO_{3/2}] \quad (4)$$

and from 0 to 90.0 mol % of units of the formula (5)

$$[SiO_{4/2}] \quad (5),$$

in which $R^5$ is a hydrogen atom, hydroxyl group, SiC-bonded, optionally substituted $C_1$- to $C_{18}$-hydrocarbon radical, optionally interrupted by divalent radicals —O—, —COO—, —OOC—, —CONR$^6$—, —NR$^6$CO— and —CO— bonded on both sides to carbon atoms, or a $C_1$- to $C_{18}$-hydrocarbonoxy radical, $R^6$ is a hydrogen atom or $C_1$ to $C_{18}$-hydrocarbon radical, with the proviso that the organopolysiloxanes (B) have at least 2 units of the formulae (2) to (5) and the sum of the units of the formulae (2) to (5) is 100 mol %, (C) organosilicon compounds comprising from 0.0 to 100.0 mol % of units of the formula (6)

$$[R^7{}_3SiO_{1/2}] \quad (6),$$

from 0.0 to 98.0 mol % of units of the formula (7)

$$[R^7{}_2SiO_{2/2}] \quad (7),$$

from 0.0 to 98.0 mol % of units of the formula (8)

$$[R^7SiO_{3/2}] \quad (8)$$

and from 0.0 to 98.0 mol % of units of the formula (9)

$$[SiO_{4/2}] \quad (9),$$

in which $R^7$ is a hydroxyl group, divalent SiC-bonded, optionally substituted $C_1$- to $C_{18}$-hydrocarbon radical, which may be interrupted by divalent radicals from the group consisting of —O—, —COO—, —OOC—, —CONR$^6$—, —NR$^6$CO— and —CO— bonded on both sides to carbon atoms, or a $C_1$- to $C_{18}$-hydrocarbon-oxy radical, with the proviso that, in the organosilicon compounds (C), at least 90 mol % of the radicals $R^7$ are $C_1$- to $C_{18}$-hydrocarbonoxy radicals and the sum of the units of the formulae (1) to (4) is 100 mol %, and (D) organosilanes of the formula (10)

$$Si(R^8)_4 \quad (10),$$

in which $R^8$ are $C_1$ to $C_{18}$-hydrocarbonoxy radicals.

2. The process of claim 1, wherein the radicals $R^1$, $R^3$, $R^4$, $R^5$, $R^6$ and $R^7$ are individually selected from methyl, ethyl, propyl and phenyl radicals.

3. The process of claim 1, wherein the hydrocarbonoxy radicals $R^7$ and $R^8$ are methoxy or ethoxy radicals.

4. The process of claim 2, wherein the hydrocarbonoxy radicals $R^7$ and $R^8$ are methoxy or ethoxy radicals.

5. The process of claim 1, wherein the ratio of the components (A), (B), (C) and (D) is chosen so that the mixture contains 40-70% by weight of component (A), 0-60% by weight of (B), 0-60% by weight of (C) and 0-60% by weight of (D), the sum of the components (B), (C) and (D) being at least 30% by weight and the sum of the components (A), (B), (C) and (D) being 100% by weight.

6. The process of claim 2, wherein the ratio of the components (A), (B), (C) and (D) is chosen so that the mixture contains 40-70% by weight of component (A), 0-60% by weight of (B), 0-60% by weight of (C) and 0-60% by weight of (D), the sum of the components (B), (C) and (D) being at least 30% by weight and the sum of the components (A), (B), (C) and (D) being 100% by weight.

7. The process of claim 3, wherein the ratio of the components (A), (B), (C) and (D) is chosen so that the mixture contains 40-70% by weight of component (A), 0-60% by weight of (B), 0-60% by weight of (C) and 0-60% by weight of (D), the sum of the components (B), (C) and (D) being at least 30% by weight and the sum of the components (A), (B), (C) and (D) being 100% by weight.

8. The process of claim 4, wherein the ratio of the components (A), (B), (C) and (D) is chosen so that the mixture contains 40-70% by weight of component (A), 0-60% by weight of (B), 0-60% by weight of (C) and 0-60% by weight of (D), the sum of the components (B), (C) and (D) being at least 30% by weight and the sum of the components (A), (B), (C) and (D) being 100% by weight.

9. The process of claim 1, wherein a mixture of the components (A), (B), (C) and (D) is first homogeneously mixed with the organic polymer and a mixture obtained thereby is mixed in a subsequent step with the inorganic material.

10. The process of claim 1, wherein unsaturated polyester resins or acrylate resins are used as the organic polymer.

11. The process of claim 1, further comprising heating the composite at elevated temperature to effect a curing of the organic polymer.

* * * * *